100 # United States Patent

Norris

[15] 3,687,041
[45] Aug. 29, 1972

[54] MULTIPLE ZONE STEREO RANGEFINDER

[72] Inventor: Philip R. Norris, North Reading, Mass.

[73] Assignee: Polaroid Corporation, Cambridge, Mass.

[22] Filed: Feb. 26, 1971

[21] Appl. No.: 119,268

[52] U.S. Cl..........................95/44 C, 95/45, 356/8, 356/12
[51] Int. Cl..............................................G03b 3/00
[58] Field of Search ......95/44 R, 44 C, 45; 356/8, 12

[56] References Cited

UNITED STATES PATENTS

| | | | |
|---|---|---|---|
| 2,918,855 | 12/1959 | Wilkenson | 95/44 C |
| 3,198,098 | 8/1965 | Karpf | 95/44 R |
| 3,200,727 | 8/1965 | Barton | 95/44 C |
| 3,253,528 | 5/1966 | Bing | 95/44 R |

Primary Examiner—Samuel S. Matthews
Assistant Examiner—Richard A. Wintercorn
Attorney—Brown & Mikulka and William D. Roberson

[57] ABSTRACT

A camera is disclosed incorporating an improved stereoscopic binocular rangefinder. The rangefinder mechanism and its coupling to the camera are constructed so they can be adjusted to accommodate for changes in the objective lens of the camera, e.g., as related to the addition of a close-up attachment to the objective lens.

13 Claims, 5 Drawing Figures

Patented Aug. 29, 1972

INVENTOR.
PHILIP R. NORRIS

BY Brown and Mikulka
and
Frederick H. Brustman
ATTORNEYS

MULTIPLE ZONE STEREO RANGEFINDER

BACKGROUND OF THE INVENTION

The present invention is useful with a rangefinder camera which uses a close-up attachment on its objective lens or which uses interchangeable objective lenses. Rangefinder cameras generally rely on mechanical motion resulting from changing the focus setting of the objective lens to adjust the rangefinder and, in some established manner, indicate what the objective lens focuses on at a particular setting.

Prior art devices typically comprise a coupling mechanism designed for use with an objective lens having a specific focal length. When the focal length of the objective lens on the rangefinder camera is altered, for example, by adding an auxiliary close-up lens to it, the focus indicated by the rangefinder will not correspond to the actual focus. Something must be done to the rangefinder, or the coupling mechanism, or both, if accurate ranges are to be indicated with the close-up lens and focusing errors eliminated.

Prior to the present invention, rangefinder cameras were provided with attachments to be clipped in front of the rangefinder when close-up lenses, etc., were used with the camera. These attachments were generally prism and lens combinations intended to alter the rangefinder's optics rather than its mechanism. Such prior art attachments have not been fully satisfactory due, inter alia, to the accuracy of the combination being insufficient for close-up photographic ranging and parallax errors. Interchangeable rangefinders (one for close-ups, another for normal photos) are each more precise than a single rangefinder with inaccurate compensating attachments, but separate rangefinders are clearly inconvenient.

SUMMARY OF THE INVENTION

The present invention represents an improvement in the coupling mechanism which links a stereoscopic or other rangefinder to the focusing means of a camera. The improvement comprises means for altering the coupling mechanism so the rangefinder provides an accurate indication of what the camera focuses on, notwithstanding the attachment of an auxiliary lens to the objective lens, or the substitution of a different objective lens, or the use of a spacer to increase the distance between the objective lens and the film plane, or any other magnification means for substantially changing the ratio of image size to object size. In the present invention, the optical path distance (OPD) between a reticle and an imaging mirror within the rangefinder is increased and a mathematical function generator which relates objective lens focusing movement to the indicated focus is changed.

An object of the present invention is to provide an improved mechanism for coupling a stereoscopic binocular rangefinder to the camera.

Another object resides in the provision of a mechanism for coupling a stereoscopic binocular rangefinder to a camera which can be quickly adopted for changes in the camera's lens.

Yet another object is to provide a quickly adjustable mechanism for coupling a rangefinder to a camera which promotes ranging in its alternate configurations.

Other objects of the invention will in part be obvious and will in part appear hereinafter.

DESCRIPTION OF THE DRAWINGS

Other objects and many of the attendant advantages of the present invention will be better appreciated and said invention will become clearly understood by reference to the following detailed description when considered in conjunction with the accompanying drawings illustrating one embodiment of the instant invention, wherein.

DESCRIPTION OF THE PREFERRED EMBODIMENT

Figure 1:
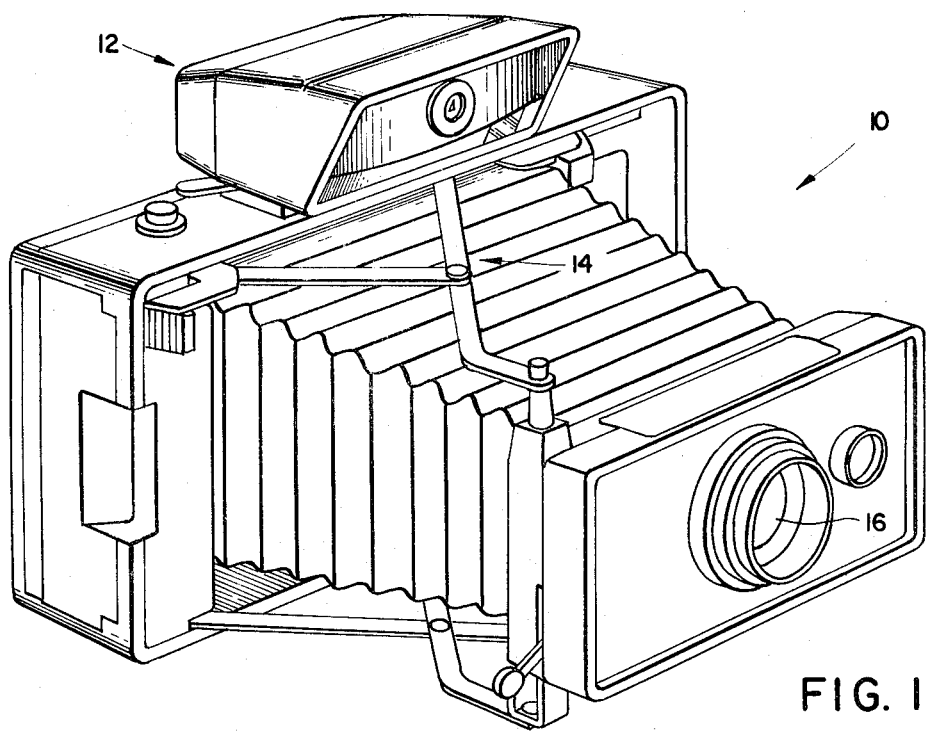
FIG. 1 illustrates a focusing camera with an improved stereoscopic rangefinder.

Referring to FIG. 1, a camera 10 is shown with a stereoscopic binocular rangefinder 12 mounted on the upper portion thereof. The camera 10 is focused by an operating linkage 14 in a manner (more fully described in U.S. Pat. No. 3,185,060 and commonly assigned herewith) to change the distance between an objective lens 16 and a film plane of the camera (not shown). Coupling means, described below, connected to the linkage 14 operate the rangefinder to indicate the focus of the lens 16.

Figure 2:
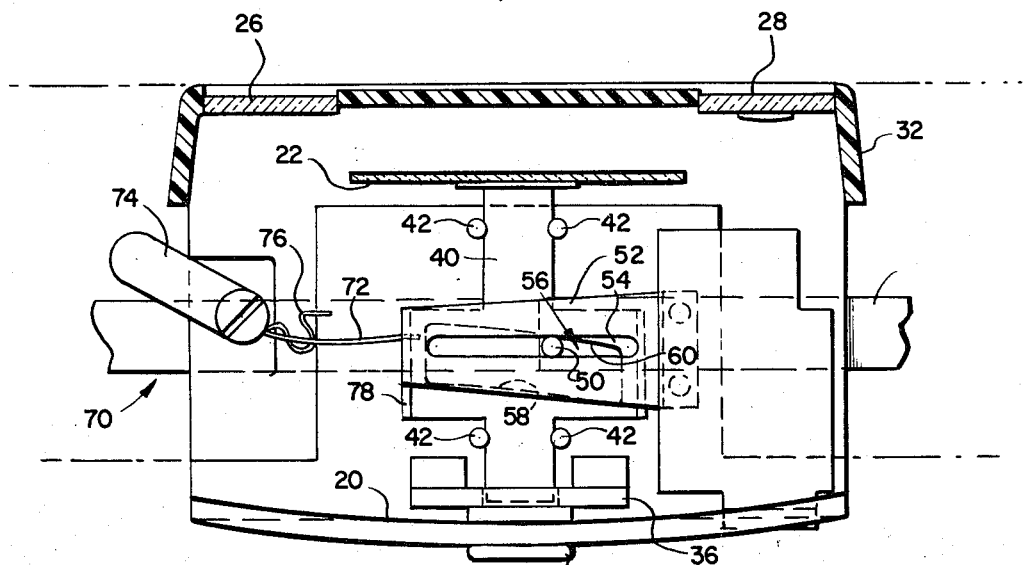
FIG. 2 illustrates the mechanism of the rangefinder in a first configuration.
Figure 3:
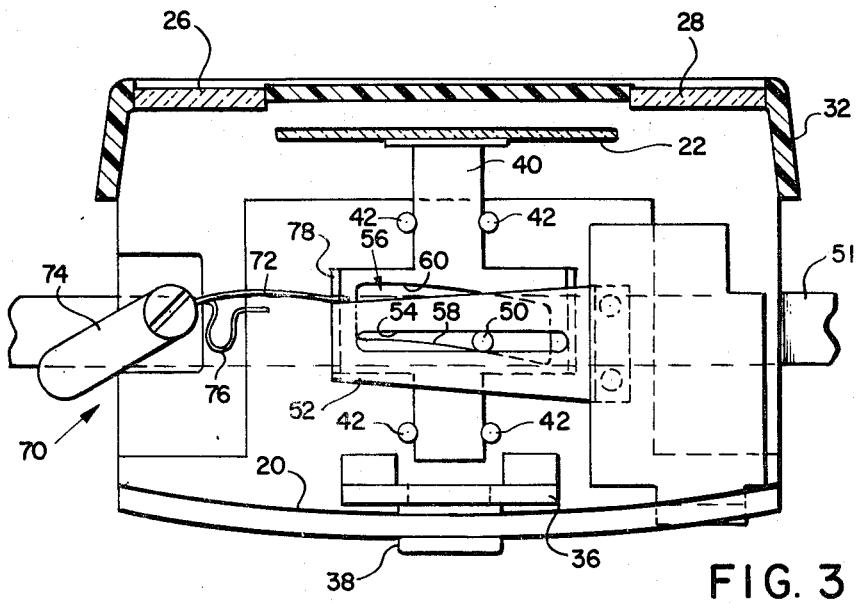
FIG. 3 illustrates the mechanism of the rangefinder in a second configuration.
Figure 4:
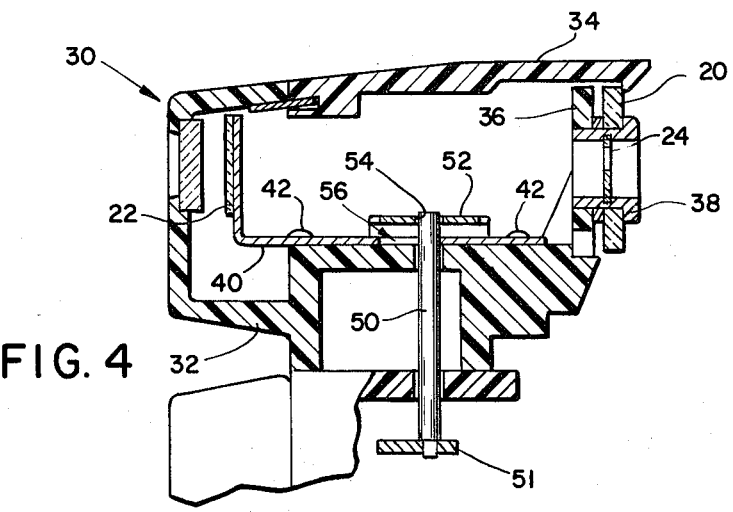
FIG. 4 illustrates the connection between the focusing linkage of the camera and the rangefinder; and, FIG. 5 illustrates a reticle for use in the improved rangefinder.

The optical arrangement of the stereoscopic rangefinder 12 can be best understood with reference to FIG. 2. The principal optical elements are a semi-transparent concave mirror 20, a planar mirror 22 and, as best seen in FIG. 4, a reticle 24 at the center of the concave mirror 20. Referring back to FIG. 2, the planar mirror 22 is movably spaced from concave mirror 20 a distance equal to about one-half the focal length of the concave mirror 20. The planar mirror 22 reflects an image of the reticle 24 onto the concave mirror 20. The concave mirror 20 forms a virtual image of the reticle 24 which appears in front of the camera 10.

An observer looking through both right eye window 26 and left eye window 28 sees the reticle image stereoscopically. Changing the optical path distance between the reticle 24 and the concave mirror 20, i.e., moving the planar mirror 22, alters the apparent distance from the camera 14 to the stereoscopic image. Changing the optical path distance in a predetermined manner in response to movement of the lens 16 causes the stereoscopic virtual image to indicate the distance at which the camera 10 is focused.

U.S. patent application, Ser. No. 37,667, now U.S. Patent No. 3,661,064, filed May 15, 1970, in the name of Philip R. Norris, entitled "Stereo Rangefinder" and assigned to Polaroid Corporation, describes the foregoing optical system in greater detail.

Referring again to both FIGS. 2 and 4, the parts of the improved stereoscopic rangefinder fit within a housing 30 having a base 32 which attaches to the camera 10 and a cap 34. A bracket 36 attached to the base 32 supports the semi-transparent concave mirror 20. A tubular fastener 38 holds the concave mirror 20 to the bracket 36. Within the opening of the fastener 38 is the reticle 24. Ambient light illuminates the reticle 24. The planar mirror 22 rides on a sliding member 40 which is guided by pins 42 set into the base 32.

Movement of sliding member 40 changes the optical path distance between the concave mirror 20 and the reticle 24, thereby causing the stereoscopic rangefinder 12 to indicate a different distance by altering the binocular convergence angle and thereby fusing the virtual images of the reticle 24 received by the left and right eyes of the user. Changing said optical path distance also changes the apparent magnification of the reticle images.

The sliding member 40 is actuated in response to focus changes of the lens 16 by a coupling mechanism comprising: a pin 50 attached to a transversely moving bar 51 which comprises part of the operating linkage 14; a guide member 52 attached to the base 32 having a guide slot 54 therein; and a dual cam slot 56 which is integral with the sliding member 40. The dual cam slot 56 is wider than the pin 50 so the pin contacts only one of the two edges 58 and 60 of the cam slot 56 at a time. The edges 58 and 60 can have different function-generating contours.

To urge either the edge 58 or the edge 60 into contact with the pin 50, an overcenter device 70 and a leaf spring 72 are provided. The overcenter device comprises a pivoted lever 74 and a spring 76. The spring 76 urges the lever 74 against a first stop (not shown). To change the position of the lever 74, an applied force must overcome the force of the spring 76 and move the lever past its center position, whereupon the spring 76 urges the lever 74 against a second stop (not shown). The leaf spring 72 is attached to the lever 74 and engages a tab 78 which is attached to the sliding member 40. Thus, as one can now understand, depending on the disposition of the overcenter device 70, the leaf spring 72 urges the sliding member 40 either toward or away from the concave mirror 20 causing the edge 58 to bear against the pin 50 (if the sliding member 40 is urged toward the concave mirror 20) and causing the edge 60 to bear against the pin 50 if the sliding member 40 is urged away from said mirror 20. The leaf spring 72 will continue to urge a particular edge of the cam slot 56 against the pin 50 until the overcenter device 70 is changed, whereupon it will urge the other edge of the cam slot 56 against the pin 50.

Lateral movement of the pin 50 bearing against an edge of the cam slot 56 will be translated into forward or backward motion of the sliding member 40 and, consequently, change the stereoscopically indicated focus.

The pin 50 moves laterally in when the camera 10 is focused by means of the operating linkage 14 which moves the lens 16 because it rides on the transversely moving bar 51 which comprises part of the linkage 14. Operating the linkage 14 to move the lens 16 away from the focal plane, whereby the camera focuses on closer subjects, causes the bar 51 to move leftward (as perceived by a subject facing the camera 10). Leftward motion of the bar 51 results in the planar mirror 22 approaching the concave mirror 20. The focus indicated by the stereo rangefinder thus moves closer to the camera, too.

For normal photography (i.e., subjects spaced several focal lengths and more from the camera), the overcenter device 70 moves the sliding member 40 backward, urging the edge 58 into contact with the pin 50. In this instance the optical path distance between the reticle 24 and the concave mirror 20, via the planar mirror 22, is approximately the focal length of the concave mirror. The edge 58 is contoured so the optical path difference changes in a predetermined manner as the focus of the camera 10 is changed. The reticle images fuse into a single image at a binocular convergence angle relates to the distance at which the camera 10 is focused.

Figure 5:
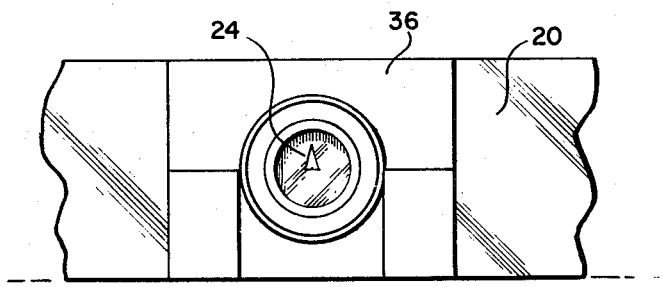

For close-up photography (i.e., subjects spaced a few focal lengths and less from the camera), especially with a close-up lens attachment, the overcenter device 70 is changed to move sliding member 40 forward, the leaf spring 72 now urges the edge 60 into contact with the pin 50. In this instance, the optical path between the reticle 24 and the concave mirror 20 via the planar mirror 22 is reduced. Consequently, a greater binocular convergence angle is required to fuse the reticle images into a single image indicating to the observer that the fused image is closer to the camera 10 in relation to the new focus range in the camera 10. The edge 60 is contoured so the optical path difference between the concave mirror 20 and the reticle 24 changes in a predetermined, but different, manner as the focus of the camera 10 changes at close-up range. The function generated by the edge 60 can allow for the addition of a selected close-up attachment to the objective lens 16. FIG. 2 shows the sliding member 40 in the close-up photography position while FIG. 5 shows the sliding member in the normal photography position.

Two important changes effected by the mechanism which alters the coupling mechanism between the operating linkage 14 and the rangefinder optics are: (1) the gross movement of the planar mirror 22 on sliding member 40 to the close-up position shown in FIG. 2., i.e., substantially shorter optical path distance between the reticle 24 and the concave mirror 20 via the planar mirror 22; and (2) the substitution of a different cam track, edge 60, with a shape specifically predetermined to maintain correlation between convergence angle in the rangefinder, i.e., the indicated focal position, and the actual distance the camera 10 focuses at with a selected close-up attachment.

One finds the stereo rangefinder, according to the present invention, to be an accurate indicator of range for close-up subjects. This is attributed to the specifically chosen function for the cam track, edge 60, which is not compromised for another focal range of the camera 10, and to relatively large changes in the bifocal convergence angle to fuse virtual images of the reticle as the indicated focus changes to close-up distances.

It can now be appreciated that other means can also be used to affect the present invention. Specifically, a rotating plate, pivoted on the sliding member 40, can be substituted for the dual cam track slot 58 and 60. Rotating such a plate changes the angle of attack of a cam slot. Each angular position of the cam track is then used for ranging over a different zone of focus, i.e., close-up, intermediate, normal, etc.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A binocular rangefinder for use with a focusable camera with an objective lens and adapted to use at least one auxiliary lens; said rangefinder functioning on the principle of correspondence between two visual convergence angles to determine the distance to a subject, with a first of said convergence angles permitting the fusing of a right eye image and left eye image of said subject, and a second of said convergence angles permitting the fusing of a right eye image and left eye image of a reticle, said binocular rangefinder comprising:

concave mirror means, with at least one partially transparent reflecting surface having a predetermined focal length; said concave mirror means having a right viewing portion to provide said right eye image and a left viewing portion to provide said left eye image, said portions having a generatrix common to both and a fixed orientation with respect to each other;

reticle means equally spaced from said right viewing portion and from said left viewing portion by optical paths of equal length and viewable by reflection from the concave surface of said concave mirror means;

planar mirror means, opposite said concave mirror means, for reflecting at least one image of said reticle to said concave surface;

a sliding member to support said planar mirror;

cam means in said sliding member, including a slot, having a first edge of such shape as to move said planar mirror in a first predetermined manner related to focal settings of said camera with said objective lens and a second edge of such shape as to move said planar mirror in a second predetermined manner related to focal settings of said camera with said at least one auxiliary lens attached to said objective lens;

a drive pin, responsive to changes in said focal settings, and adapted to engage said cam means; and means for causing said drive pin to engage one of said first and said second edges.

2. A focus-coupled rangefinder for use with a focusable camera adapted for using magnification means for substantially changing the ratio of image size to object size, including:

means, integral with a coupling between the camera focus control and said rangefinder, for altering said coupling to vary the response of said rangefinder to changes in the focus setting of said camera; and means, connected to said altering means and to said coupling, for actuating said altering means whereby said coupling may be altered as a consequence of the use of said magnification means and the focus setting of said camera, as determined by said rangefinder, will be correct irrespective of the use of said magnification means.

3. The rangefinder described in claim 2, wherein said coupling is controlled by a cam and said means for altering said coupling includes a mechanism for changing the pitch of said cam.

4. The rangefinder described in claim 2, wherein said coupling includes:

first cam means of such shape as to vary the response of said rangefinder in conjunction with changes in the focus setting of said camera;

second cam means of such shape as to vary the response of said rangefinder in conjunction with changes in the focus setting of said camera used together with said magnification means; and means for selecting one of said cam means in accord with the nominal ratio of image size to object size.

5. The rangefinder described in claim 4, wherein said first and said second cam means comprise opposite edges of a slot.

6. A binocular rangefinder for use with a focusable camera adapted to use auxiliary magnification means to substantially change the ratio of image size to object size; said rangefinder functioning on the principle of correspondence between two visual convergence angles to determine the distance to a subject, with a first of said convergence angles permitting the fusing of a right eye image and left eye image of said subject, and a second of said convergence angles permitting the fusing of a right eye image and left eye image of a reticle, said binocular rangefinder comprising:

concave mirror means, with at least one partially transparent reflecting surface having a predetermined focal length; said concave mirror means having a right viewing portion to provide said right eye images and a left viewing portion to provide said left eye images, said portions having a generatrix common to both and a fixed orientation with respect to each other;

reticle means equally spaced from said right viewing portion and from said left viewing portion by optical paths of equal length and viewable by reflection from the concave surface of said concave mirror means; and means for varying the length of said optical paths as a function of the focal setting of said camera; said function being changeable as a consequence of changes in said magnification means.

7. The binocular rangefinder described in claim 6, further comprising:

planar mirror means, opposite said concave mirror means, for reflecting at least one image of said reticle to said concave surface.

8. The binocular rangefinder described in claim 6, wherein said optical paths have lengths not exceeding said predetermined focal length.

9. The binocular rangefinder described in claim 7, further comprising:

a sliding member to support said planar mirror;

cam means in said sliding member; and a drive pin, responsive to changes in said focal setting, and adapted to engage said cam means.

10. The binocular rangefinder described in claim 9, wherein said magnification means comprises at least one objective lens and at least one auxiliary lens and said cam means comprises a slot in said sliding member, including:

a first edge of such shape as to move said planar mirror in a first predetermined manner related to focal settings of said camera with said objective lens; and a second edge of such shape as to move said planar mirror in a second predetermined manner related to focal settings of said camera with said at least one auxiliary lens, said first and second edges separated so said drive pin can engage only one edge at a time.

11. In combination with a focusable camera having an objective lens adapted to cooperate with means for changing its focal length, a stereoscopic binocular rangefinder of the kind having a partially transparent concave mirror and a reticle optically spaced from said concave mirror an optical distance not to exceed a focal length of said concave mirror, and means for adjusting said optical distance in a preselected way to indicate, by means of images formed of said reticle, the focal setting of said camera, including:

dual cam means for altering said means for adjusting said optical distance in a preselected way to correspond with a predetermined change in the focal length of said objective lens; and selection means for engaging said dual cam means in accord with the predetermined focal length of said objective lens.

12. The improved stereoscopic binocular rangefinder described in claim 11, wherein said means for adjusting said optical distance includes:

a sliding member adapted to change said optical distance;

a cam slot in said sliding member;

a first functional shape on a first edge of said cam slot;

a second functional shape on a second edge of said cam slot;

a driver attached to said camera's focusing mechanism and engaging said cam slot such that said driver bears on only one of said edges; and means for causing said driver to bear alternatively on the other edge of said cam slot.

13. The improved stereoscopic binocular rangefinder described in claim 12 wherein said focal length of said objective lens is changed by adding to said objective lens an auxiliary lens and said first functional shape relates to said objective lens and said second functional shape relates to the combination of said objective lens together with said auxiliary lens.

* * * * *